Jan. 16, 1934.  C. R. HEMENWAY  1,943,311
GAS MAKING DEVICE
Filed Feb. 16, 1931   2 Sheets-Sheet 1
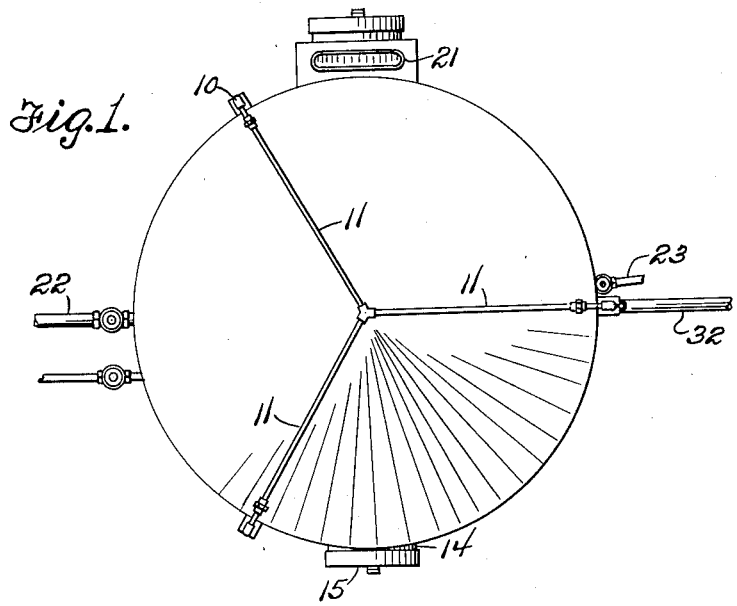
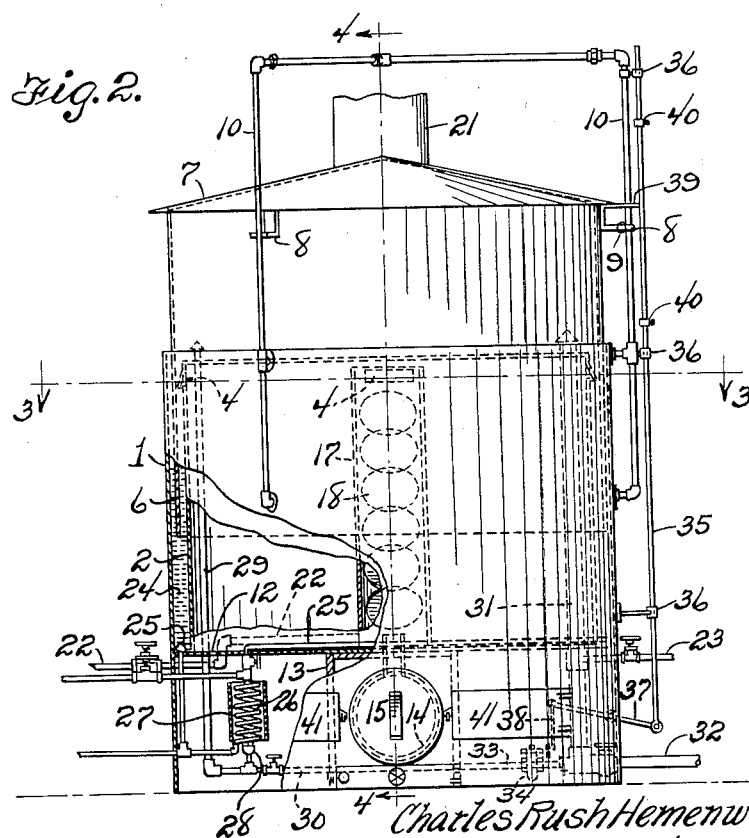
Charles Rush Hemenway INVENTOR
BY A. L. Evans
ATTORNEY Jan. 16, 1934.   C. R. HEMENWAY   1,943,311
GAS MAKING DEVICE
Filed Feb. 16, 1931   2 Sheets-Sheet 2
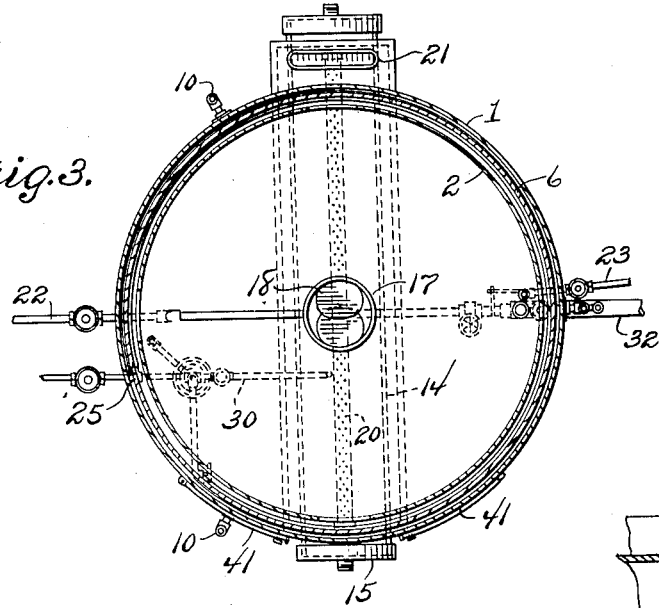
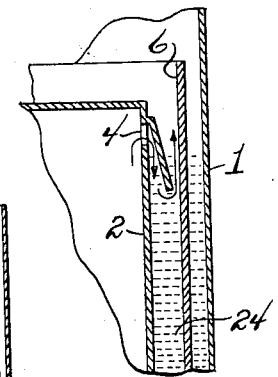
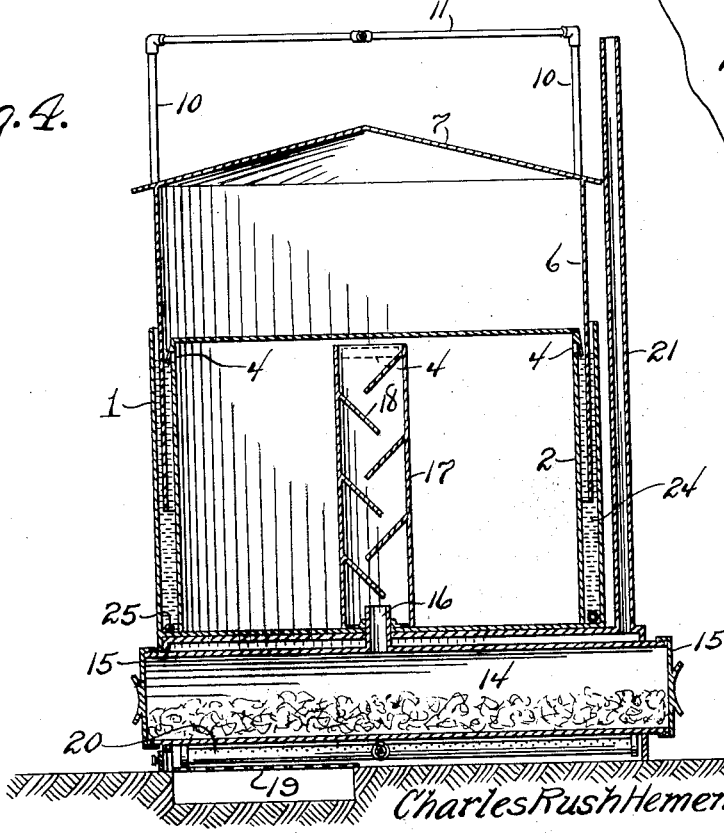

Patented Jan. 16, 1934

1,943,311

UNITED STATES PATENT OFFICE 1,943,311

GAS MAKING DEVICE

Charles Rush Hemenway, Oklahoma City, Okla.

Application February 16, 1931. Serial No. 516,165

2 Claims. (Cl. 183—30)

This invention relates to gas making devices, and its general object is to provide an apparatus for producing combustible gas from vegetable waste matter, trash and the like.

A further object of the invention is to provide a device of the character set forth, that not only produces gas but will extract from the gaseous vapors, tars, oils and foreign matter, with the result the gas produced will be substantially pure and highly combustible.

Another object of the invention is to provide a gas making device that will also consume trash, waste material and vegetable matter, and therefore will act in the capacity of an incinerator.

A still further object of the invention is to provide a gas making device that also includes a storage means for the gas.

Another object of the invention is to provide a device of the character set forth, that is simple in construction, inexpensive to manufacture and extremely efficient in operation and service.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompany drawings wherein like characters denote like or corresponding parts throughout the several views, and in which:

Figure 1 is a top plan view of the device which forms the subject matter of the present invention.

Figure 2 is a side elevation with parts broken away to illustrate the interior construction.

Figure 3 is a sectional view taken approximately on line 3—3 of Figure 2, looking in the direction of the arrows.

Figure 4 is a sectional view taken approximately on line 4—4 of Figure 2, looking in the direction of the arrows.

Figure 5 is a detail fragmentary view illustrating one of the passage-ways for the gas, from the purifying tank to the reservoir.

Referring to the drawings in detail, the reference numeral 1 indicates a tank which may be referred to as the outer tank and in fact is in the form of a cylindrical container having an open top as clearly shown in Figure 4 of the drawings. Mounted on the bottom of the tank 1 and having its vertical wall arranged in spaced relation with respect to the vertical wall of the tank 1 is what I term a purifying tank 2 which is provided with a closed top 3 and provided in the vertical wall of the purifying tank 2 adjacent the top thereof are slots 4 arranged diametrically opposite each other for a purpose which will be presently apparent. These slots 4 are provided with inclined baffles 5 carried by the outer side of the vertical wall of the tank as best shown in Fig. 5, for a purpose to be hereinafter described.

Arranged for slidable movement between the vertical walls of the purifying tank 2 and the tank 1 is the vertical wall of a bell 6 that is provided with a cone shape top 7 which extends beyond the vertical wall thereof as shown. Formed with the vertical wall of the bell 6 adjacent the top thereof are angle brackets 8 that have mounted for rotation in the horizontal portions thereof rollers 9 that engage rods 10, the latter being secured to the outer tank 1 and rising therefrom. The rods have their upper ends secured to cross rods 11 so as the rods 10 will be supported in a true vertical position, as they act in the capacity as guide means for the bell, through the medium of the rollers and the angle brackets as will be apparent.

The bottom of the outer tank 1 is in fact a false bottom and is indicated by the reference numeral 12. Arranged below the false bottom is a compartment 13 which is elongated in formation and centrally disposed with respect to the tank 1. An elongated cylinder 14 is disposed within the compartment 13 and extends beyond the tank 1 as shown in Figure 4, and this cylinder 14 acts in the capacity as a retort. The ends of the cylinder 14 are closed by cap members 15 which may be threadedly secured to the ends, and these cap members are provided with handles.

Formed with the cylinder 14 and rising therefrom is a pipe 16 that extends through the bottom of the tank 1 as well as the bottom of the purifying tank 2 and terminates in a relatively small cylindrical compartment 17 that has arranged therein a plurality of baffle plates 18 which are disposed in superposed relation with respect to each other and at an inclination, with the upper ends secured to the inner wall of the cylindrical compartment 17 whereby the outer ends will be arranged in overlapping association, to provide a zigzag path for the gas and vapor from the elongated cylinder. The upper end of the cylindrical compartment 17 is open, and terminates a slight distance below the top of the purifying tank 2 as will be noted upon inspection of Figure 4.

The compartment 13 acts in the capacity as a fire box, and a grate 19 is adapted to be arranged therein for the purpose of receiving fuel which is used in the preliminary stages as a heating means for the elongated cylinder or retort 14, but after sufficient gas is generated, there is provided a gas burner 20 which is disposed below the elongated cylinder as best shown in Figure 4. The compartment 13 is provided with a smoke stack 21 which rises from the rear end thereof and terminates adjacent the upper ends of the rods 10.

Arranged in communication with the cylindrical compartment 17 and extending therefrom is a pipe 22 which is adapted for the purpose of drawing off tar from the cylindrical compartment, and for the purpose of drawing off creosote and like matter from the purifying tank 2, there is provided a pipe 23 that is disposed in communication with the purifying tank 2 and extends from the bottom thereof, as best shown in Figure 2. The pipes 22 and 23 are each provided with valves for controlling the same as will be apparent.

As the gas is passed from the purifying tank 2, to the bell, it must flow through the slots 4 and is directed downwardly through the medium of the shields 5 so that the gas will necessarily have to pass through water which for distinction is indicated by the reference numeral 24, and which is arranged between the vertical walls of the tanks 1 and 2. In order to prevent this water from freezing, there is provided what I term an anti-freezing coil 25 that is arranged on the bottom of the tank 1 and between the vertical wall of the latter and the vertical wall of the purifying tank 2. The anti-freezing coil is in communication with a water supply as well as a heating coil 26 which is arranged within a compartment 27 below the false bottom of the tank 1, and the heating coil 26 is heated by a burner 28 which receives gas from the reservoir through the instrumentality of a pipe 29, the latter having its upper end terminating within the bell and provided with a cap as shown. In communication with the pipe 29 is a pipe 30 which extends to the gas burner 20 and acts in the capacity of a pilot burner therefor.

In order to draw off the gas from the bell for use other than for the device, there is provided a vertical pipe 31 that is of greater diameter than the pipe 29 and the pipe 31 is also provided with a cap and has its lower end in communication with a pipe 32, which may be termed an outlet pipe. The pipe 31 has disposed in communication therewith a pipe 33 that supplies gas to the gas burner 20 and this pipe 33 has a valve 34 arranged therein for controlling the supply of gas to the burner. The valve 34 is automatically controlled in accordance with the supply of gas within the reservoir 6 and this action is accomplished through the medium of a trip rod 35 that is mounted for slidable movement in brackets 36 secured to one of the rods 10 and the tank 1. The lower end of the trip rod 35 has pivotally secured thereto a link 37 which is pivotally secured intermediate its ends and has its opposite end pivotally secured to a lever 38, the latter being connected to the valve 34 for operating the same as will be apparent. One of the angle brackets is provided with an upper horizontal portion 39 that extends in close proximity to the trip rod 35 and in the path of collars 40 which are secured to the trip rod 35 by set screws. By this construction, it will be observed that when the bell reaches its greatest height, the upper horizontal portion 39 will engage the upper collar 40 and therefore close the valve 34, and when the bell reaches its lowermost position, the upper horizontal portion 39 will engage the lower collar 40 and open the valve.

The portion of the tank 1 below the false bottom thereof is provided with doors 41 whereby access may be had to the respective valves disposed therein as shown, as the pilot light pipe, as well as the pipe which leads to the anti-freezing coil 25 are provided with valves.

From the above description and disclosure of the drawings, it will be obvious that I have provided a device that not only generates gas, but provides a gas which is substantially pure, and highly combustible, due to the fact that all the impurities are removed therefrom, as well as tars, creosote and the like, and the water further removes foreign matter from the gas.

In the operation of the device, the cylinder or retort 14 is filled with trash, or waste matter such as straw, hay, shavings or the like, and a fire is built in the fire box 13 so as to cause the matter within the cylinder 14 to carbonize to produce gas or vapor which rises through the pipe 16 and comes in contact with the baffle plates 18 where the heavy vapors such as tar and the like is removed from the gas or vapor which then passes into the purifying tank 2, where the lighter vapors such as creosote are removed therefrom. The gaseous vapor is then practically pure gas that passes through the slots 4 and water 24 for disposal within the reservoir tank 6. When sufficient gas has accumulated within the bell 6, to allow for the operation of the burner 20, such is put into operation, but of course if desired, an outside supply of gas may be utilized in place of the fire box in starting the device, the outside supply of gas being connected to the gas burner 20 as will be apparent.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. In a machine of the kind described, an outer tank, a false bottom disposed in said outer tank above the lower edge thereof, a purifying tank disposed upon the false bottom and having a closed top, a cylinder centrally arranged within the purifying tank and having an open top in communication with said tank, reversely inclined spaced baffle plates arranged within the cylinder and disposed in overlapped relation to each other, said purifying tank having slots arranged diametrically opposite each other therein, and inclined baffles exteriorly on the purifying tank to overhang the slots.

2. In a machine of the kind described, an outer tank, a false bottom disposed in said outer tank above the lower edge thereof, a purifying tank disposed upon the false bottom and having a closed top, a cylinder centrally arranged within the purifying tank and having an open top in communication with said tank, reversely inclined spaced baffle plates arranged within the cylinder and disposed in overlapped relation to each other, said purifying tank having slots arranged diametrically opposite each other therein, inclined baffles exteriorly on the purifying tank to overhang the slots, an elongated cylinder disposed beneath the false bottom and closed at opposite ends, and a pipe rising from said cylinder through the false bottom into the cylinder centrally located within the purifying tank.

CHARLES RUSH HEMENWAY.